United States Patent
Honda et al.

(10) Patent No.: US 12,037,451 B2
(45) Date of Patent: Jul. 16, 2024

(54) THERMOPLASTIC RESIN, MOLDED OBJECT, AND MONOMER FOR THERMOPLASTIC RESIN

(71) Applicant: MITSUBISHI GAS CHEMICAL COMPANY, INC., Tokyo (JP)

(72) Inventors: Eiichi Honda, Kanagawa (JP); Manabu Hirakawa, Kanagawa (JP); Yasuaki Yoshimura, Kanagawa (JP); Yuichiro Satake, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 510 days.

(21) Appl. No.: 17/602,394

(22) PCT Filed: Mar. 31, 2020

(86) PCT No.: PCT/JP2020/014842
§ 371 (c)(1),
(2) Date: Oct. 8, 2021

(87) PCT Pub. No.: WO2020/213389
PCT Pub. Date: Oct. 22, 2020

(65) Prior Publication Data
US 2022/0162378 A1 May 26, 2022

(30) Foreign Application Priority Data
Apr. 18, 2019 (JP) .................. 2019-079219

(51) Int. Cl.
*C08G 63/137* (2006.01)
*C08G 63/199* (2006.01)
*C08G 63/64* (2006.01)
*C08G 64/02* (2006.01)

(52) U.S. Cl.
CPC .......... *C08G 63/64* (2013.01); *C08G 63/199* (2013.01); *C08G 64/0208* (2013.01)

(58) Field of Classification Search
CPC ............................ C08G 63/199; C08G 63/137
See application file for complete search history.

(56) References Cited

U.S. PATENT DOCUMENTS

| | | |
|---|---|---|
| 10,913,848 B2 | 2/2021 | Hirakawa et al. |
| 10,947,342 B2 | 3/2021 | Yoshimura et al. |
| 2017/0088504 A1* | 3/2017 | Motoi ................ C08G 64/0208 |
| 2017/0276837 A1* | 9/2017 | Kato ....................... G02B 1/041 |
| 2018/0273466 A1 | 9/2018 | Motoi et al. |
| 2018/0305494 A1 | 10/2018 | Satake et al. |
| 2019/0033489 A1 | 1/2019 | Kato et al. |
| 2019/0106376 A1 | 4/2019 | Motoi et al. |
| 2019/0225571 A1 | 7/2019 | Motoi et al. |
| 2020/0031990 A1* | 1/2020 | Yoshimura ............. C08G 63/00 |
| 2020/0224025 A1 | 7/2020 | Hirakawa et al. |

FOREIGN PATENT DOCUMENTS

| | | | |
|---|---|---|---|
| EP | 3 202 815 A1 | 8/2017 | |
| EP | 3 351 577 A1 | 7/2018 | |
| EP | 3 415 546 A1 | 12/2018 | |
| EP | 3 521 867 A1 | 8/2019 | |
| EP | 3 604 440 A1 | 2/2020 | |
| JP | 2-69520 A | 3/1990 | |
| JP | 5-70584 A | 3/1993 | |
| WO | 2015/147242 A1 | 10/2015 | |
| WO | 2016/052370 A1 | 4/2016 | |
| WO | 2017/047555 A1 | 3/2017 | |
| WO | 2018/062327 A1 | 4/2018 | |
| WO | WO-2018062327 A1 * | 4/2018 | ............. C08G 63/00 |
| WO | 2018/181157 A1 | 10/2018 | |

OTHER PUBLICATIONS

International Search Report issued in International Patent Application No. PCT/JP2020/014842, dated Jun. 23, 2020, along with an English translation thereof.
Written Opinion of the International Searching Authority issued in International Patent Application No. PCT/JP2020/014842, dated Jun. 23, 2020, along with an English translation thereof.

* cited by examiner

*Primary Examiner* — Robert C Boyle
(74) *Attorney, Agent, or Firm* — GREENBLUM & BERNSTEIN P.L.C.

(57) ABSTRACT

Provided is a thermoplastic resin having a constituent unit represented by the following general formula (I):

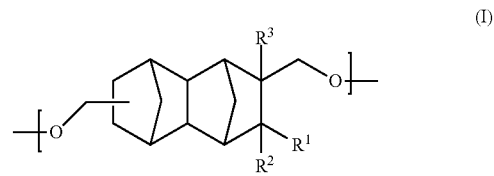

wherein $R^1$ represents a hydrocarbon group containing 1 to 6 carbon atoms, and $R^2$ and $R^3$ each independently represent a hydrogen atom or a methyl group.

17 Claims, No Drawings

THERMOPLASTIC RESIN, MOLDED OBJECT, AND MONOMER FOR THERMOPLASTIC RESIN

TECHNICAL FIELD

The present invention relates to a thermoplastic resin, a molded body formed by molding a resin composition comprising the thermoplastic resin, and a monomer for thermoplastic resin, which is used as a raw material for the thermoplastic resin.

BACKGROUND ART

As materials for optical elements installed in various types of cameras, such as a camera, a film-integrated camera and a video camera, optical glasses or optical transparent resins have been used.

As such optical glasses, many types of materials, which are excellent in heat resistance, transparency, dimensional stability, chemical resistance and the like, and have various refractive indexes (nD) or Abbe numbers (vD), have existed. However, these optical glasses have been problematic in terms of high material costs, poor formability and low productivity. In particular, since the processing of the optical glasses into aspherical lens used in aberration correction requires extremely high techniques and high costs, which cause major obstacles for the practical use thereof.

On the other hand, an optical lens molded using an optical transparent resin, in particular, using a thermoplastic transparent resin, is advantageous in that such an optical lens can be produced in a large amount by injection molding of the resin, and also in that an aspherical lens can be easily produced from the optical lens. Thus, at present, a thermoplastic transparent resin has been broadly used for optical purposes such as a lens for cameras.

As a thermoplastic transparent resin used for optical purposes, a polycarbonate resin is particularly suitable, and various polycarbonate resins preferable for optical purposes have been developed.

For example, Patent Literatures 1 and 2 disclose a polycarbonate copolymer comprising a perhydroxydimethanonaphthalene skeleton as a material that can be used for optical purposes, instead of an optical glass.

In addition, Patent Literature 3 discloses, as a resin that can be used to produce an optical lens with a high Abbe number, a polycarbonate resin that is made from decahydro-1,4:5,8-dimethanonapthanediol (D-NDM) as a raw material and has specific constituent units.

CITATION LIST

Patent Literature

Patent Literature 1: JP-A-H05-70584
Patent Literature 2: JP-A-H02-69520
Patent Literature 3: WO2016/052370A1

SUMMARY OF INVENTION

Technical Problem

By the way, since the position of a dihydroxymethyl group is position 2,3 in the perhydroxydimethanonaphthalene skeleton possessed by the polycarbonate copolymer disclosed in each of Patent Literatures 1 and 2, the strength of a molded body formed by molding the polycarbonate copolymer tends to be weak.

The polycarbonate resin disclosed in Patent Literature 3 is excellent in that an optical lens having a high Abbe number can be produced therefrom. However, it is desired to develop an optical material that can be used to produce a molded body having more excellent optical properties.

Solution to Problem

The present inventors have found that a thermoplastic resin having specific constituent units can achieve the aforementioned object, thereby completing the present invention.

Specifically, the present invention provides the following [1] to [17].

[1] A thermoplastic resin having a constituent unit represented by the following general formula (I):

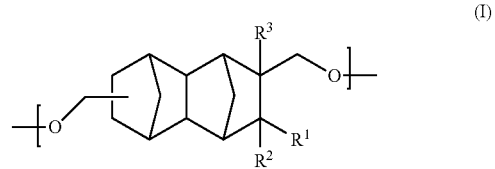

wherein $R^1$ represents a hydrocarbon group containing 1 to 6 carbon atoms, and $R^2$ and $R^3$ each independently represent a hydrogen atom or a methyl group.

[2] The thermoplastic resin according to the above [1], wherein the constituent unit comprises a constituent unit (a) derived from a compound represented by the following general formula (1a) and a constituent unit (b) derived from a compound represented by the following general formula (1b):

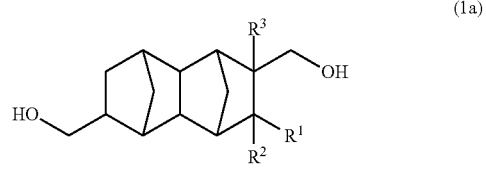

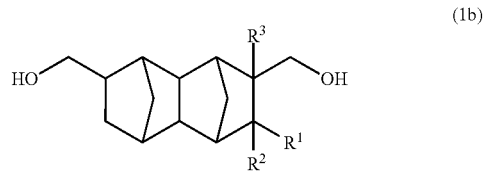

wherein, in the above formulae (1a) and (1b), $R^1$, $R^2$ and $R^3$ are the same as those in the general formula (I).

[3] The thermoplastic resin according to the above [2], wherein a content ratio [(a)/(b)] between the constituent unit (a) and the constituent unit (b) is 1/99 to 99/1 at a molar ratio.

[4] The thermoplastic resin according to any one of the above [1] to [3], which is a polycarbonate resin, a polyester resin, or a polyester carbonate resin.

[5] The thermoplastic resin according to any one of the above [1] to [4], which has a constituent unit represented by the following general formula (I-A):

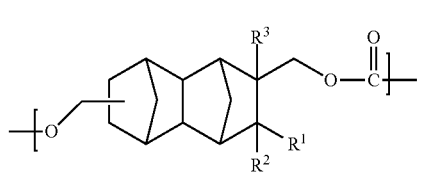

wherein $R^1$, $R^2$ and $R^3$ are the same as those in the general formula (I).

[6] The thermoplastic resin according to any one of the above [1] to [4], which has a constituent unit represented by the following general formula (I-B):

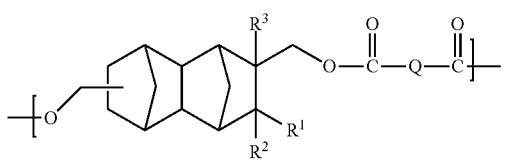

wherein $R^1$, $R^2$ and $R^3$ are the same as those in the general formula (I), and Q represents a hydrocarbon group containing 2 to 30 carbon atoms.

[7] The thermoplastic resin according to any one of the above [1] to [4], which has a constituent unit represented by the following general formula (I-A) and a constituent unit represented by the following general formula (I-B).

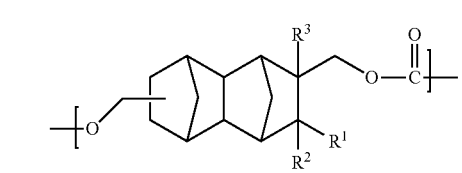

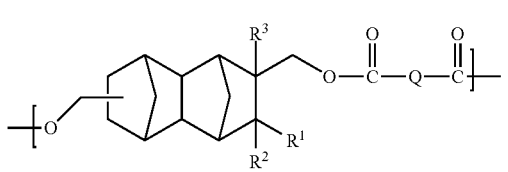

wherein, in the above formulae (I-A) and (I-B), $R^1$, $R^2$ and $R^3$ are the same as those in the general formula (I), and Q represents a hydrocarbon group containing 2 to 30 carbon atoms.

[8] The thermoplastic resin according to any one of the above [5] to [7], which further has a constituent unit represented by the following general formula (II):

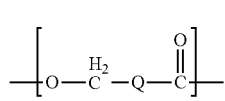

wherein Q represents a hydrocarbon group containing 2 to 30 carbon atoms.

[9] The thermoplastic resin according to any one of the above [6] to [8], wherein Q is a group represented by the following general formula (i) or (ii):

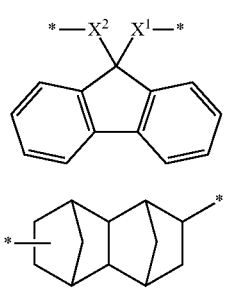

wherein, in the above formulae (i) and (ii), $X^1$ and $X^2$ each independently represent a hydrocarbon group containing 1 to 12 carbon atoms, and * represents a binding site.

[10] The thermoplastic resin according to any one of the above [1] to [9], wherein the weight average molecular weight (Mw) of the thermoplastic resin is 5,000 to 50,000.

[11] The thermoplastic resin according to any one of the above [1] to [10], wherein $R^1$ represents a methyl group, an ethyl group, or a phenyl group, and $R^2$ and $R^3$ each represent a hydrogen atom.

[12] The thermoplastic resin according to any one of the above [1] to [11], wherein $R^1$ represents a methyl group, and $R^2$ and $R^3$ each represent a hydrogen atom.

[13] A molded body formed by molding a resin composition comprising the thermoplastic resin according to any one of the above [1] to [12].

[14] The molded body according to the above [13], which is an optical member.

[15] The molded body according to the above [13] or [14], which is an optical lens.

[16] A monomer for thermoplastic resin, which is represented by the following general formula (1).

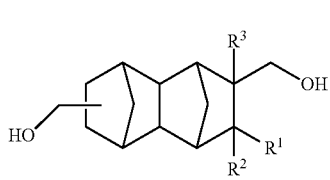

wherein $R^1$ represents a hydrocarbon group containing 1 to 6 carbon atoms, and $R^2$ and $R^3$ each independently represent a hydrogen atom or a methyl group.

[17] The monomer for thermoplastic resin according to the above [16], which is a monomer constituting a thermoplastic resin used as a molding material for an optical member.

Advantageous Effects of Invention

The thermoplastic resin of a preferred aspect of the present invention can be used to produce a molded body having more excellent optical properties, and for example, the present thermoplastic resin may become a material for forming a molded body having low specific gravity, low birefringence, reduced photoelastic coefficient, and high hardness.

DESCRIPTION OF EMBODIMENTS

[Thermoplastic Resin]

The thermoplastic resin of the present invention has a constituent unit represented by the following general formula (I):

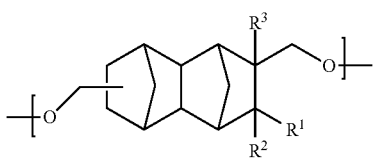

(I)

In the above general formula (I), $R^1$ represents a hydrocarbon group containing 1 to 6 carbon atoms, and $R^2$ and $R^3$ each independently represent a hydrogen atom or a methyl group.

Since the thermoplastic resin of the present invention has the above-described constituent unit, wherein $R^1$ is a hydrocarbon group containing 1 to 6 carbon atoms, it may become a material for forming a molded body having low specific gravity, low birefringence, reduced photoelastic coefficient, and high hardness.

Examples of the above-described hydrocarbon group that can be selected as $R^1$ may include: alkyl groups such as a methyl group, an ethyl group, an n-propyl group, an isopropyl group, an n-butyl group, an isobutyl group, a sec-butyl group, a t-butyl group, various types of pentyl group, and various types of hexyl groups; and a cyclopentyl group, a cyclohexyl group, and a phenyl group.

Among these, the above-described hydrocarbon group that can be selected as R' is preferably an alkyl group containing 1 to 3 carbon atoms or a phenyl group, is more preferably a methyl group, an ethyl group or a phenyl group, and is further preferably a methyl group.

With regard to the thermoplastic resin of one aspect of the present invention, in the above general formula (I), it is preferable that $R^1$ is a methyl group, an ethyl group or a phenyl group, and $R^2$ and $R^3$ are hydrogen atoms, and it is more preferable that $R^1$ is a methyl group, and $R^2$ and $R^3$ are hydrogen atoms.

By the way, the constituent unit represented by the above general formula (I), which is possessed by the thermoplastic resin of the present invention, is derived from a monomer for thermoplastic resin represented by the following general formula (1).

This monomer for thermoplastic resin is a raw material monomer constituting the thermoplastic resin of the present invention used as a molding material for an optical member.

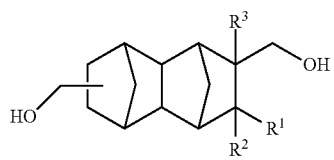

(1)

In the formula (1), $R^1$ represents a hydrocarbon group containing 1 to 6 carbon atoms, and $R^2$ and $R^3$ each independently represent a hydrogen atom or a methyl group.

Besides, preferred aspects of $R^1$, $R^2$, and $R^3$ are the same as those in the aforementioned general formula (I).

The thermoplastic resin monomer represented by the above general formula (1) is preferably a compound represented by the following general formula (1a) or a compound represented by the following general formula (1b).

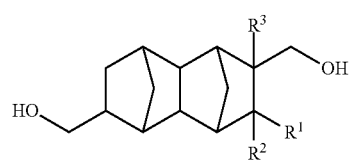

(1a)

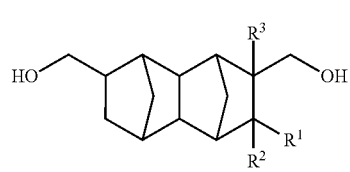

(1b)

In the above general formulae (1a) and (1b), $R^1$, $R^2$ and $R^3$ are the same as those in the general formulae (I) and (1).

In the thermoplastic resin of one aspect of the present invention, the constituent unit represented by the above general formula (I) preferably comprises a constituent unit (a) derived from the compound represented by the above general formula (1a) and a constituent unit (b) derived from the compound represented by the above general formula (1b).

The content ratio [(a)/(b)] between the constituent unit (a) and the constituent unit (b) is, at a mass ratio, preferably 1/99 to 99/1, more preferably 5/95 to 95/5, further preferably 10/90 to 90/10, still further preferably 20/80 to 80/20, and particularly preferably 35/65 to 65/35.

In the thermoplastic resin of one aspect of the present invention, the content of the constituent unit represented by the above general formula (I) is preferably 10 mol % or more, more preferably 20 mol % or more, further preferably 30 mol % or more, and still further preferably 40 mol % or more, with respect to the total amount (100 mol %) of the constituent units of the thermoplastic resin.

The thermoplastic resin of one aspect of the present invention may also comprise a constituent unit derived from another diol compound other than the monomer for thermoplastic resin represented by the general formula (1).

Examples of such another diol may include ethylene glycol, 1,2-propanediol, 1,3-propanediol, 1,4-butanediol, 1,2-butanediol, 1,3-butanediol, neopentyl glycol, 1,5-pentanediol, 1,6-hexanediol, diethylene glycol, triethylene glycol, polyethylene glycol, polypropylene glycol, cyclohexanedimethanol, tricyclodecanedimethanol, pentacyclopentadecanedimethanol, 2,2,4,4-tetramethyl-1,3-cyclobutanediol, hydrogenated bisphenol A, spiroglycol, isosorbide, bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, bisphenol Z, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, and 9,9-bis (4-(2-hydroxyethoxy)-3-phenylphenyl)fluorene.

In the thermoplastic resin of one aspect of the present invention, the amount of the constituent unit derived from another diol compound is preferably 0% to 200 mol %, more preferably 0% to 100 mol %, further preferably 0% to 50 mol %, still further preferably 0% to 20 mol %, and particularly preferably 0% to 10 mol %, with respect to the total amount (100 mol %) of the constituent unit represented by the general formula (I).

With regard to the thermoplastic resin of one aspect of the present invention, a diol compound comprising the monomer for thermoplastic resin represented by the general formula (1) may react and bind with a monomer capable of reacting a hydroxyl group of the diol compound, so that the thermoplastic resin may have the aspect of a polycarbonate resin, a polyester resin, or a polyester carbonate resin.

The thermoplastic resin of one aspect of the present invention having the aspect of a polycarbonate resin may be a polymer having a constituent unit represented by the following general formula (I-A).

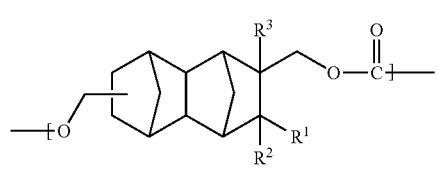
(I-A)

In the above general formula (I-A), $R^1$, $R^2$ and $R^3$ are the same as those in the general formula (I), and preferred aspects thereof are also the same as those in the general formula (I).

The constituent unit represented by the above general formula (I-A) is the constituent unit represented by the general formula (I), into which a carbonyl group is introduced.

The constituent unit represented by the above general formula (I-A) can be formed, for example, by allowing the monomer for thermoplastic resin represented by the above general formula (1) to react with phosgene (carbonyl chloride) or carbonic acid diester.

The thermoplastic resin of one aspect of the present invention having the aspect of a polyester resin may be a polymer having a constituent unit represented by the following general formula (I-B).

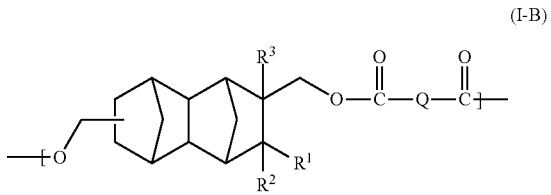
(I-B)

In the above general formula (I-B), $R^1$, $R^2$ and $R^3$ are the same as those in the general formula (I), and preferred aspects thereof are also the same as those in the general formula (I). Q represents a hydrocarbon group containing 2 to 30 carbon atoms.

The constituent unit represented by the above general formula (I-B) is the constituent unit represented by the general formula (I), to which a dicarboxylic acid-derived constitution is added.

The constituent unit represented by the above general formula (I-B) can be formed, for example, by subjecting the monomer for thermoplastic resin represented by the above general formula (1) used as a diol and dicarboxylic acid represented by the following general formula (2a) to an esterification reaction.

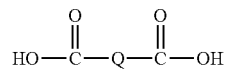
(2a)

wherein Q is the same as that in the general formula (I-B).

The thermoplastic resin of one aspect of the present invention having the aspect of a polyester carbonate resin may be a copolymer having the constituent unit represented by the above general formula (I-A) and the constituent unit represented by the above general formula (I-B).

That is, such a polyester carbonate resin can be formed by allowing the monomer for thermoplastic resin represented by the above general formula (1) used as a diol to react with phosgene (carbonyl chloride) or carbonic acid diester, and dicarboxylic acid.

In the polyester carbonate resin that is one aspect of the present invention, the content ratio [(I-A)/(I-B)] between the constituent unit represented by the above general formula (I-A) and the constituent unit represented by the above general formula (I-B) is appropriately adjusted. The content ratio [(I-A)/(I-B)] is, at a molar ratio, preferably 1/99 to 99/1, more preferably 5/95 to 95/5, further preferably 10/90 to 90/10, and still further preferably 20/80 to 80/20.

Moreover, the polycarbonate resin, the polyester resin, and the polyester carbonate resin, each of which is one aspect of the present invention, may further comprise a constituent unit represented by the following general formula (II).

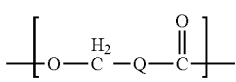
(II)

In the above general formula (II), Q represents a hydrocarbon group containing 2 to 30 carbon atoms.

The constituent unit represented by the above general formula (II) is a unit derived from a monomer represented by the following general formula (2b).

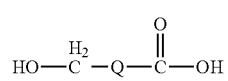
(2b)

wherein Q is the same as that in the above general formula (II).

A hydroxy group (—OH) of the monomer represented by the above general formula (2b) reacts with phosgene (carbonyl chloride) or dicarboxylic acid, and a carboxy group (—COOH) of the monomer reacts with the monomer for thermoplastic resin represented by the general formula (1).

Moreover, a hydroxy group of the monomer may bind to a carboxy group of the monomer in another molecule according to an esterification reaction.

The hydrocarbon group containing 2 to 30 carbon atoms that can be selected as Q in the above general formula (I-B) and the above general formula (H) may be a divalent hydrogen group, and examples thereof may include: linear or branched alkylene groups containing 2 to 30 carbon atoms, such as an ethylene group, a propylene group, an isopropylene group, a 1,4-butylene group, a 1,3-butylene group, a tetramethylene group, a 1,5-pentylene group, a 1,4-pentylene group, a 1,3-pentylene group, a 2-ethyl-2-methyltrimethylene group, a heptamethylene group, a 2-methyl-2-propyltrimethylene group, a 2,2-diethyltrimethylene group, an octamethylene group, a nonamethylene group, and a decamethylene group; cycloalkylene groups containing 3 to 30 carbon atoms, such as a cyclopropylene group, a cyclobutylene group, a cyclopentylene group, a cyclohexylene group, a cyclooctylene group, a cyclodecylene group, and a 1,3-adamantyl group; arylene groups containing 6 to 30 carbon atoms, such as phenylene groups including a 1,2-phenylene group, a 1,3-phenylene group and a 1,4-phenylene group, a biphenylene group, a naphthylene group, a divalent group having a phenanthrene structure, and a divalent group having a fluorene structure; and a group represented by the following general formula (i) or (ii).

Besides, at least one hydrogen atom of these groups may be further substituted with a substituent, and examples of such a substituent may include an alkyl group containing 1 to 6 carbon atoms, a cycloalkyl group containing 3 to 12 carbon atoms, and an aryl group containing 6 to 12 carbon atoms.

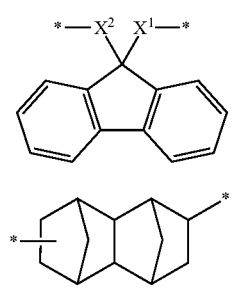

In the above general formulae (i) and (ii), $X^1$ and $X^2$ each independently represent a hydrocarbon group containing 1 to 12 carbon atoms, and * represents a binding site.

Examples of the hydrocarbon group may include a linear or branched alkylene group containing 1 to 12 carbon atoms, a cycloalkylene group containing 3 to 12 carbon atoms, and an arylene group containing 6 to 12 carbon atoms. The hydrocarbon group is preferably a linear alkylene group containing 1 to 12 carbon atoms or an arylene group containing 6 to 12 carbon atoms, and is more preferably a methylene group, an ethylene group, or a phenylene group.

The weight average molecular weight (Mw) of the thermoplastic resin of one aspect of the present invention is preferably 5,000 to 60,000, more preferably 7,000 to 50,000, and further preferably 8,000 to 40,000.

It is to be noted that, in the present description, the weight average molecular weight (Mw) is a value relative to standard polystyrene that is measured according to a gel permeation chromatography (GPC) method, and specifically, it means a value measured according to the method described in Examples.

The glass transition temperature (Tg) of the thermoplastic resin of one aspect of the present invention is preferably 95° C. to 180° C., more preferably 110° C. to 160° C., further preferably 120° C. to 160° C., and still further preferably 125° C. to 160° C.

It is to be noted that, in the present description, the glass transition temperature (Tg) of the thermoplastic resin is a value measured in accordance with JIS K7121-1987, using a differential scanning calorimeter (DSC), and specifically, it means a value measured according to the method described in Examples.

[Method for Producing Monomer for Thermoplastic Resin]

The monomer for thermoplastic resin represented by the above general formula (1) can be synthesized, for example, according to the following scheme, using, as raw materials, dicyclopentadiene or cyclopentadiene, and unsaturated aldehyde having the functional groups ($R^1$, $R^2$, and $R^3$).

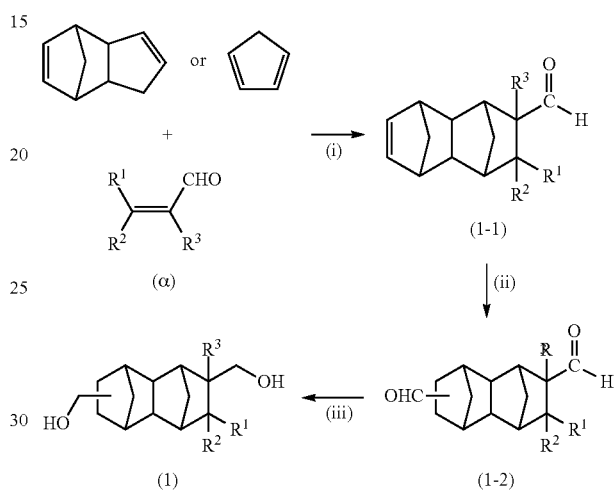

wherein $R^1$, $R^2$ and $R^3$ are the same as those in the general formula (I).

<Step (i)>

First, in the step (i), dicyclopentadiene and the unsaturated aldehyde represented by the above formula (a) having the functional groups ($R^1$, $R^2$, and $R^3$) are subjected to a Diels-Alder reaction, so as to synthesize the compound represented by the above formula (1-1).

The functional groups $R^1$, $R^2$, and $R^3$ possessed by the unsaturated aldehyde represented by the above formula (α) correspond to the functional groups $R^1$, $R^2$, and $R^3$ of the monomer for thermoplastic resin represented by the above general formula (1) as a final product.

The dicyclopentadiene used in the Diels-Alder reaction preferably has high purity, and it is preferable that the mixing of butadiene, isoprene, etc. is avoided as much as possible. The purity of the dicyclopentadiene is preferably 90% or more, and more preferably 95% or more.

In addition, since it has been known that dicyclopentadiene is depolymerized under heating conditions and is thereby converted to cyclopentadiene (monocyclopentadiene), it is also possible to use cyclopentadiene instead of dicyclopentadiene.

The unsaturated aldehyde includes two types of geometric isomers, namely, cis-form and trans-form isomers. Such cis-form and trans-form isomers may be each used alone, or the two types of isomers may be mixed with each other and may be used.

It is considered that the compound represented by the formula (1-1) (hereinafter also referred to as a "compound (1-1)") is substantially generated through a compound represented by the following formula (1-1a) (a first-stage Diels-Alder reaction product), and that a generated compound represented by the following formula (1-1a) reacts, as a new parent diene compound (Dienophile), with cyclopentadiene (Diene) existing in the reaction system according to Diels-Alder reaction (a second-stage Diels-Alder reaction) to generate the compound represented by the formula (1-1).

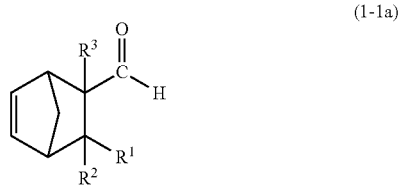

(1-1a)

wherein $R^1$, $R^2$ and $R^3$ are the same as those in the general formula (I).

For efficient progression of the above-described two-stage Diels-Alder reactions, it is important that cyclopentadiene is present in the reaction system. Thus, the reaction temperature is preferably 100° C. or higher, more preferably 120° C. or higher, and further preferably 130° C. or higher. On the other hand, from the viewpoint of suppression of generation of high-boiling substances as by-products, the reaction temperature is preferably 250° C. or lower.

In addition, as a reaction solvent, a hydrocarbon solvent, an alcohol solvent, an ester solvent, etc. can be used. The reaction solvent is preferably an aliphatic hydrocarbon solvent containing 6 or more carbon atoms, such as cyclohexane, toluene, xylene, ethylbenzene, mesitylene, propanol, butanol, or 2-octanol.

Examples of the reaction system of the Diels-Alder reaction that can be adopted in the step (i) may include various reaction systems, such as a batch system using a tank reactor, etc., a semi-batch system of supplying a substrate or a substrate solution into a tank reactor under reaction conditions, and a continuous flow system of supplying substrates into a tubular reactor under reaction conditions.

The product obtained by the Diels-Alder reaction can be directly used as a raw material for a hydroformylation reaction in the next step. Otherwise, the product may be subjected to a purification treatment such as distillation, extraction, or crystallization, and may be then subjected to the next step.

<Step (ii)>

In the step (ii), carbon monoxide and hydrogen gas are supplied to the compound (1-1), and a hydroformylation reaction is carried out in the presence of a rhodium compound and an organophosphorus compound, so as to generate the compound represented by the above formula (1-2) (hereinafter also referred to as a "compound (1-2)").

The rhodium compound used in the hydroformylation reaction in the present step is not particularly limited, as long as it forms a complex with an organophosphorus compound, and exhibits hydroformylation activity in the presence of carbon monoxide and hydrogen.

For example, a catalyst precursor substance such as dicarbonylacetylacetonato rhodium (hereinafter referred to as "Rh(acac)(CO)$_2$"), $Rh_2O_3$, $Rh_4(CO)_{12}$, $Rh_6(CO)_{16}$, or $Rh(NO_3)_3$ may be introduced, together with the organophosphorus compound, into a reaction mixture, so that a rhodium metal hydride carbonyl phosphorus complex having catalytic activity may be formed in a reactor. Otherwise, such a rhodium metal hydride carbonyl phosphorus complex may be prepared in advance, and may be then introduced into the reactor.

A specific example of a preferred method may be a method which comprises allowing Rh(acac)(CO)$_2$ to react with an organophosphorus compound in the presence of a solvent, and then introducing the resultant together with an excessive amount of organophosphorus compound into a reactor to form a rhodium-organic phosphorus complex having catalytic activity.

The amount of the rhodium compound used in the hydroformylation reaction in the present step is preferably 10 to 100 µmol, more preferably 20 to 70 µmol, and further preferably 25 to 50 µmol, with respect to 1 mol of the compound (1-1) that is a substrate of the hydroformylation reaction.

In the hydroformylation reaction in the present step, the organophosphorus compound that forms a catalyst of the hydroformylation reaction with the rhodium compound may be phosphine represented by the general formula P(—$R^A$)(—$R^B$)(—$R^C$), or phosphite represented by the general formula P(—O$R^A$)(—O$R^B$)(—O$R^C$).

Examples of the $R^A$, $R^B$, and $R^C$ may include an aryl group optionally substituted with an alkyl group containing 1 to 4 carbon atoms or an alkoxy group, and an alicyclic alkyl group optionally substituted with an alkyl group containing 1 to 4 carbon atoms or an alkoxy group.

Among these, the organophosphorus compound is preferably triphenylphosphine or triphenylphosphite.

The amount of the organophosphorus compound used in the hydroformylation reaction in the present step is preferably 50 to 5,000 moles, more preferably 70 to 3,000 moles, and further preferably 90 to 2,000 moles, with respect to 1 mole of the rhodium metal.

The hydroformylation reaction in the present step can be carried out without using a solvent. However, by using a solvent inactive to the reaction, the hydroformylation reaction can be more preferably carried out.

The solvent is not particularly limited, as long as the compound (1-1), dicyclopentadiene or cyclopentadiene, the above-described rhodium compound, and the above-described organophosphorus compound can be dissolved in the solvent. Specific examples of the solvent may include: hydrocarbons such as aliphatic hydrocarbon, alicyclic hydrocarbon, and aromatic hydrocarbon; esters such as aliphatic ester, alicyclic ester, and aromatic ester; alcohols such as aliphatic alcohol and alicyclic alcohol; and aromatic halides.

Among these, the solvent is preferably hydrocarbon, and is more preferably alicyclic hydrocarbon or aromatic hydrocarbon.

The reaction temperature applied upon the hydroformylation reaction in the present step is preferably 40° C. to 160° C., and more preferably 80° C. to 140° C.

When the reaction temperature is 40° C. or higher, a sufficient reaction speed can be obtained, and the remaining of the compound (1-1) serving as a raw material can be suppressed. On the other hand, by setting the reaction temperature at 160° C. or lower, generation of by-products derived from the compound (1-1) or the reaction product can be suppressed, and a reduction in the reaction results can be prevented.

When the hydroformylation reaction in the present step is carried out, the reaction needs to be carried out under pressurization with carbon monoxide (hereinafter also referred to as "CO") and hydrogen (hereinafter also referred to as "$H_2$") gas. Such CO and $H_2$ gas may be each independently introduced into the reaction system, or mixed gas that has previously been prepared may be introduced into the reaction system.

Since CO and $H_2$ gas introduced into the reaction system are reduced with progression of the reaction, the reaction may be simply regulated by appropriately replenishing the previously prepared mixed gas of CO and $H_2$ gas.

The reaction pressure applied in the hydroformylation reaction in the present step is preferably 1 to 12 MPa, more preferably 1.2 to 9 MPa, and further preferably 1.5 to 5 MPa.

If the reaction pressure is 1 MPa or more, a sufficient reaction speed can be obtained, and the remaining of the compound (1-1) serving as a raw material can be suppressed. On the other hand, if the reaction pressure is 12 MPa or less, expensive equipment having excellent pressure resistance performance is not necessary, and thus, it is economically advantageous. In particular, when the reaction is carried out in a batch system or a semi-batch system, it is necessary to remove CO and $H_2$ gas and/or to reduce the pressure after completion of the reaction. As the pressure is reduced, the loss of CO and $H_2$ gas is decreased, and thus, it is economically advantageous.

The reaction system for the hydroformylation reaction in the present step is preferably a batch system reaction or a semi-batch system reaction. The semi-batch system reaction can be carried out by adding a rhodium compound, an organophosphorus compound, and a solvent to a reactor, then performing pressurization with $CO/H_2$ gas, heating, etc. to create the aforementioned reaction conditions, and then supplying the compound (1-1) used as a raw material to the reactor.

The product obtained by the hydroformylation reaction can be directly used as a raw material for a reduction reaction in the next step. Otherwise, the product may be subjected to a purification treatment such as distillation, extraction, or crystallization, and may be then subjected to the next step.

<Step (iii)>

In the step (iii), the aldehyde group possessed by the compound (1-2) is hydrogenated and reduced, so as to generate the monomer for thermoplastic resin represented by the above formula (1).

The reduction reaction of the aldehyde group is preferably carried out in the presence of a catalyst having hydrogenation ability and hydrogen.

The catalyst may be, for example, a catalyst having at least one element selected from the group consisting of copper, chromium, iron, zinc, aluminum, nickel, cobalt, and palladium. Specific examples of the catalyst may include a Cu—Cr catalyst, a Cu—Zn catalyst, a Cu—Zn—Al catalyst, a Raney-Ni catalyst, and a Raney-Co catalyst.

The amount of the catalyst used is preferably 1 to 100 parts by mass, more preferably 2 to 50 parts by mass, and further preferably 5 to 30 parts by mass, with respect to the total amount (100 parts by mass) of the compound (1-2) used as a substrate.

The reaction temperature applied in the reduction reaction is preferably 80° C. to 300° C., more preferably 110° C. to 280° C., and further preferably 130° C. to 250° C.

By setting the reaction temperature at 80° C. or higher, the reaction can be completed for an appropriate period of time, and a reduction in productivity or a reduction in the yield of a product of interest can be avoided. On the other hand, by setting the reaction temperature at 180° C. or lower, the occurring of side reactions or decomposition reactions can be suppressed, and a product of interest can be obtained with a high yield.

The partial pressure of hydrogen applied upon the reduction reaction is preferably 0.1 to 20 MPa, more preferably 0.5 to 10 MPa, and further preferably 1.0 to 5 MPa.

By setting the partial pressure of hydrogen at 0.1 MPa or more, the reaction can be completed for an appropriate period of time, and a reduction in productivity or a reduction in the yield of a product of interest can be avoided. On the other hand, by setting the partial pressure of hydrogen at 20 MPa or less, the occurring of side reactions or decomposition reactions can be suppressed, and a product of interest can be obtained with a high yield.

Besides, it is also possible to allow inert gas (for example, nitrogen or argon, etc.) to coexist with hydrogen gas upon the reduction reaction.

In the reduction reaction, a solvent can be used. Examples of the solvent may include aliphatic hydrocarbons, alicyclic hydrocarbons, aromatic hydrocarbons, and alcohols. Among these, alicyclic hydrocarbons, aromatic hydrocarbons, or alcohols are preferable. Specifically, cyclohexane, toluene, xylene, methanol, ethanol, 1-propanol, 2-octanol, etc. are preferable.

Examples of the reaction system that can be adopted in the reduction reaction may include various reaction systems, such as a batch system using a tank reactor, etc., a semi-batch system of supplying a substrate or a substrate solution into a tank reactor under reaction conditions, and a continuous flow system of supplying a substrate or a substrate solution into a tubular reactor under reaction conditions.

The product obtained in the reduction reaction may be subjected to a purification treatment such as distillation, extraction, or crystallization.

[Method for Producing Thermoplastic Resin]

The thermoplastic resin of one aspect of the present invention can be produced according to a melt polycondensation method, using, as raw materials, the monomer for thermoplastic resin represented by the general formula (1) and another monomer.

Such another monomer is preferably one or more types selected from among phosgene (carbonyl chloride), carbonic acid diester, the dicarboxylic acid represented by the above general formula (2a), and the monomer represented by the above general formula (2b).

Herein, when phosgene (carbonyl chloride) or carbonic acid diester is used as another monomer, a polycarbonate resin having the constituent unit represented by the general formula (I-A) can be produced.

Examples of the carbonic acid diester may include diphenyl carbonate, ditolyl carbonate, bis(chlorophenyl) carbonate, m-cresyl carbonate, dimethyl carbonate, diethyl carbonate, dibutyl carbonate, and dicyclohexyl carbonate. Among these, from the viewpoint of reactivity and purity, diphenyl carbonate is preferable.

The amount of the carbonic acid diester mixed is preferably 0.60 to 1.10 moles, and more preferably 0.70 to 1.05 moles, with respect to 1 mole of a total of a diol component and a dicarboxylic acid component.

Moreover, when the dicarboxylic acid represented by the general formula (2a) is used as another monomer, a polyester resin having the constituent unit represented by the general formula (I-B) can be produced.

Furthermore, when phosgene (carbonyl chloride) or carbonic acid diester and the dicarboxylic acid represented by the general formula (2a) are used as other monomers, a polyester carbonate resin having the constituent unit represented by the general formula (I-A) and the constituent unit represented by the general formula (I-B) can be produced.

Further, when the monomer represented by the general formula (2b) is used as another monomer, a resin having a constituent unit represented by the above general formula (II) can be produced.

As mentioned above, the monomer for thermoplastic resin represented by the general formula (1) is converted to a mixture of a 2,6-isomer (the compound represented by the general formula (1a)) and a 2,7-isomer (the compound represented by the general formula (1b)) according to the hydroformylation reaction performed in the above step (ii).

The content ratio [2,6-isomer/2,7-isomer] between the 2,6-isomer and the 2,7-isomer is, at a mass ratio, preferably 1/99 to 99/1, more preferably 5/95 to 95/5, further preferably 10/90 to 90/10, still further preferably 20/80 to 80/20, and particularly preferably 35/65 to 65/35.

Besides, in the production of the thermoplastic resin of one aspect of the present invention, another diol compound, other than the monomer for thermoplastic resin represented by the above general formula (1) and the monomer represented by the above general formula (2b), may also be used in combination.

Examples of a polycondensation catalyst used in the melt polycondensation method may include a basic compound catalyst, a transesterification catalyst, and a mixed catalyst of these catalysts.

Examples of the basic compound catalyst may include an alkali metal compound, an alkaline-earth metal compound, and a nitrogen-containing compound.

Examples of the alkali metal compound may include the organic acid salts, inorganic salts, oxides, hydroxides, hydrides or alkoxides of alkali metals. Among these, from the viewpoints of catalytic effects, costs, distribution amount, the influence of the resin on hue, etc., sodium carbonate and sodium hydrogen carbonate are preferable.

Examples of the alkaline-earth metal compound may include the organic acid salts, inorganic salts, oxides, hydroxides, hydrides or alkoxides of the alkaline-earth metal compounds.

Examples of the nitrogen-containing compound may include quaternary ammonium hydroxides and the salts thereof, and amines.

As transesterification catalysts, the salts of metals selected from zinc, tin, zirconium, and lead are preferably used. These catalysts may be used alone or may also be used in combination of two or more types. In addition, the transesterification catalyst may also be used in combination with the aforementioned alkali metal compound or alkaline-earth metal compound.

Specific examples of the transesterification catalyst used herein may include zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonate, zirconium oxyacetate, zirconium tetrabutoxide, lead(II) acetate, lead(IV) acetate, zirconium acetate, and titanium tetrabutoxide.

Among these substances, the transesterification catalyst is preferably one or more types selected from zinc acetate, zirconium acetate and titanium tetrabutoxide, and is more preferably titanium tetrabutoxide.

The amount of the catalyst used is preferably $1 \times 10^{-9}$ to $1 \times 10^{-3}$ moles, and more preferably at a ratio of $1 \times 10^{-7}$ to $1 \times 10^{-4}$ moles, with respect to 1 mole of a total of diol compounds.

In the melt polycondensation method, melt polycondensation is carried out according to a transesterification reaction using the above-described raw materials and catalysts, under heating and under normal or reduced pressure, while removing by-products.

Specifically, the raw materials are preferably reacted at a reaction temperature of 120° C. to 260° C. (preferably, 180° C. to 260° C.) for a reaction time of 0.1 to 5 hours (preferably, 0.5 to 3 hours).

Subsequently, the reaction temperature is increased while the degree of pressure reduction in the reaction system is increased, so that a diol compound is allowed to react with other monomers, and finally, the polycondensation reaction is preferably carried out under a reduced pressure of 1 mmHg or less at a temperature of 200° C. to 350° C. for 0.05 to 2 hours.

Such a reaction may be carried out either in a continuous system or in a batch system.

The reaction apparatus used to perform the above-described reaction may be a vertical reaction apparatus equipped with an anchor-type impeller, a max-blend impeller, a helical ribbon-type impeller, etc., or a horizontal reaction apparatus equipped with paddle blades, lattice blades, glasses blades, etc., or further, an extruder-type reaction apparatus equipped with a screw, etc. Moreover, a reaction apparatus prepared by appropriately combining the aforementioned reaction apparatuses with one another, while considering the viscosity of a polymer, is preferably used.

In the method for producing the polyester carbonate resin of one aspect of the present invention, from the viewpoint of maintaining heat stability and hydrolytic stability, after completion of the polymerization reaction, the catalyst may be removed or deactivated.

In general, a method of deactivating a catalyst by addition of a known acidic substance is carried out.

Examples of the acidic substance that deactivates a catalyst may include: esters such as butyl benzoate; aromatic sulfonic acids such as p-toluenesulfonic acid; aromatic sulfonic acid esters, such as butyl p-toluenesulfonate and hexyl p-toluenesulfonate; phosphoric acids, such as phosphorous acid, phosphoric acid, and phosphonic acid; phosphorous acid esters, such as triphenyl phosphite, monophenyl phosphite, diphenyl phosphite, diethyl phosphite, di-n-propyl phosphite, di-n-butyl phosphite, di-n-hexyl phosphite, dioctyl phosphite, and monooctyl phosphite; phosphoric acid esters, such as triphenyl phosphate, diphenyl phosphate, monophenyl phosphate, dibutyl phosphate, dioctyl phosphate, and monooctyl phosphate; phosphonic acids, such as diphenyl phosphonate, dioctyl phosphonate, and dibutyl phosphonate; phosphonic acid esters such as diethyl phenyl phosphonate; phosphines, such as triphenylphosphine and bis(diphenylphosphino)ethane; boric acids, such as boric acid and phenyl borate; aromatic sulfonates, such as tetrabutylphosphonium dodecylbenzenesulfonate; organic halides, such as chloride stearate, benzoyl chloride, and p-toluenesulfonyl chloride; alkyl sulfates such as dimethyl sulfonate; and organic halogenates such as benzyl chloride.

Among these acidic substances, from the viewpoints of deactivating effects, and the hue and stability of the resin, butyl p-toluenesulfonate is preferably used.

In addition, such an acidic substance that deactivates a catalyst is used in an amount of preferably 0.01 to 50 moles, and preferably 0.3 to 20 moles, with respect to 1 mole of the catalyst.

After deactivation of the catalyst, in order to eliminate a low-boiling-point compound from the resin, a step of devolatilizing and removing such a low-boiling-point compound from the resin at a pressure of 0.1 to 1 mmHg and at a temperature of 200° C. to 350° C. may be established. In this step, a horizontal apparatus equipped with stirring blades having excellent surface renewal ability, such as paddle blades, lattice blades or glasses blades, or a thin film evaporator is preferably used.

Since the thus obtained resin is desired to contain a foreign matter in an amount as small as possible, filtration of melted raw materials and filtration of a catalyst solution are preferably carried out.

The thickness of a filter mesh used in the filtration is preferably 5 μm or less, and more preferably 1 μm or less.

Moreover, filtration of the generated resin through a polymer filter is preferably carried out.

The thickness of the polymer filter mesh is preferably 100 μm or less, and more preferably 30 μm or less. Furthermore, a step of collecting resin pellets must be naturally performed under a low-dust environment, and the class is preferably 1000 or less, and more preferably 100 or less.

[Physical Properties of Thermoplastic Resin]

The thermoplastic resin of one aspect of the present invention can be used to produce a molded body having more excellent optical properties, and the present thermoplastic resin may become, for example, a material for forming a molded body having low specific gravity, low birefringence, reduced photoelastic coefficient, and high hardness.

The refractive index of the molded body formed by molding the thermoplastic resin of one aspect of the present invention is preferably 1.50 to 1.65, more preferably 1.51 to 1.60, further preferably 1.52 to 1.58, and still further preferably 1.525 to 1.56.

It is to be noted that, in the present description, the refractive index means a value measured in accordance with JIS K7142.

The specific gravity of the molded body formed by molding the thermoplastic resin of one aspect of the present invention is preferably 1.30 or less, more preferably 1.25 or less, and further preferably 1.20 or less.

It is to be noted that, in the present description, the specific gravity means a value measured in accordance with JIS K7112.

The birefringence at 600 nm of the molded body formed by molding the thermoplastic resin of one aspect of the present invention, which is measured according to the method described in the after-mentioned Examples, is preferably 150 nm or less, more preferably 135 nm or less, and further preferably 100 nm or less.

The photoelastic coefficient of the molded body formed by molding the thermoplastic resin of one aspect of the present invention is preferably $60 \times 10^{-12}$ $Pa^{-1}$ or less, more preferably $55 \times 10^{-12}$ $Pa^{-1}$ or less, and further preferably $40 \times 10^{-12}$ $Pa^{-1}$ or less.

It is to be noted that, in the present description, the photoelastic coefficient means a value measured using an ellipsometer (manufactured by JASCO Corporation; product name "M-220").

The pencil hardness of the molded body formed by molding the thermoplastic resin of one aspect of the present invention is preferably B or higher, more preferably HB or higher, and further preferably F or higher.

It is to be noted that, in the present description, the pencil hardness means a value measured in accordance with JIS-K5600-5-4.

[Molded Body]

The molded body of one aspect of the present invention is formed by molding a resin composition comprising the aforementioned thermoplastic resin.

The resin composition used as a material for forming the molded body may only consist of the aforementioned thermoplastic resin, but it may further comprise additives.

In one aspect of the present invention, the content of the thermoplastic resin is determined, as appropriate, depending on the type of a molded product. The content of the thermoplastic is generally 30% to 100% by mass, preferably 50% to 100% by mass, more preferably 60% to 100% by mass, further preferably 70% to 100% by mass, and still further preferably 80% to 100% by mass, with respect to the total amount (100% by mass) of the resin composition.

Examples of the above-described additives used in one aspect of the present invention may include an antioxidant, a release agent, a processing stabilizer, an ultraviolet absorber, a fluidity modifier, a crystal nucleating agent, a strengthening agent, a dye, an antistatic agent, a bluing agent, and an antibacterial agent.

These additives may be each used alone as a single type, or may be each used in combination of two or more types.

<Antioxidant>

Examples of the antioxidant used in one aspect of the present invention may include triethylene glycol-bis [3-(3-tert-butyl-5-methyl-4-hydroxyphenyl)propionate], 1,6-hexanediol-bis [3-(3,5-di-tert-butyl-4-hydroxyphenyl)propionate], pentaerythritol-tetrakis [3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylene-bis(3,5-di-tert-butyl-4-hydroxy-hydrocyanamide), 3,5-di-tert-butyl-4-hydroxy-benzylphosphonate-diethyl ester, tris(3,5-di-tert-butyl-4-hydroxybenzyl)isocyanurate, and 3,9-bis{1,1-dimethyl-2-[β-(3-(3-tert-butyl-4-hydroxy-5-methylphenyl)propionyloxy]ethyl}-2,4,8,10-tetraoxaspiro(5,5)undecane.

The content of the antioxidant is preferably 0.01% to 0.50% by mass, more preferably 0.10% to 0.40% by mass, and further preferably 0.20% to 0.40% by mass, with respect to the total amount (100% by mass) of the resin composition.

<Release Agent>

The release agent used in one aspect of the present invention preferably comprises an ester of alcohol and fatty acid, and more preferably comprises such an ester in an amount of 90% to 100% by mass with respect to the total amount of the release agent.

Examples of the ester may include an ester of monohydric alcohol and fatty acid, and a partial ester or complete ester of polyhydric alcohol and fatty acid.

The ester of monohydric alcohol and fatty acid, which is used as a release agent, is preferably an ester of monohydric alcohol having 1 to 20 carbon atoms and saturated fatty acid having 10 to 30 carbon atoms.

Specific examples of the ester of monohydric alcohol and saturated fatty acid may include stearyl stearate, palmityl palmitate, butyl stearate, methyl laurate, and isopropyl palmitate.

The partial ester or complete ester of polyhydric alcohol and fatty acid, which is used as a release agent, is preferably a partial ester or complete ester of polyhydric alcohol having 1 to 25 carbon atoms and saturated fatty acid having 10 to 30 carbon atoms.

Specific examples of the partial ester or complete ester of polyhydric alcohol and saturated fatty acid may include partial esters or complete esters of dipentaerythritols, such as stearic acid monoglyceride, stearic acid monoglyceride, stearic acid diglyceride, stearic acid triglyceride, monosorbitate stearate, behenic acid monoglyceride, capric acid monoglyceride, lauric acid monoglyceride, pentaerythritol monostearate, pentaerythritol tetrastearate, pentaerythritol tetrapelargonate, propylene glycol monostearate, biphenyl biphenate, sorbitan monostearate, 2-ethylhexyl stearate, and dipentaerythritol hexastearate.

The content of the release agent is preferably 0.01% to 0.50% by mass, more preferably 0.02% to 0.10% by mass, and further preferably 0.03% to 0.05% by mass, with respect to the total amount (100% by mass) of the resin composition.

<Processing Stabilizer>

Examples of the processing stabilizer used in one aspect of the present invention may include 2-t-butyl-6-(3-t-butyl-2-hydroxy-5-methylbenzyl)-4-methylphenyl acrylate, 2,4-di-t-butyl-6-[1-(3,5-di-t-butyl-2-hydroxyphenyl)ethyl]phenyl acrylate, 2,4-di-t-amyl-6-[1-(3,5-di-t-amyl-2-hydroxyphenyl)ethyl] phenyl acrylate, 2-t-butyl-6-(3-t-butyl-2-hydroxy-5-methylbenzyl)-4-methylphenyl methacrylate, and 2,4-di-t-amyl-6-[1-(3,5-di-t-amyl-2-hydroxyphenyl)ethyl] phenyl methacrylate.

The content of the processing stabilizer is preferably 0.01% to 3.0% by mass with respect to the total amount (100% by mass) of the resin composition.

<Ultraviolet Absorber>

Examples of the ultraviolet absorber used in one aspect of the present invention may include benzophenones, benzotriazoles, triazines, benzoates, salicylates, cyanoacrylates, oxalic acid anilides, malonic acid esters, and formamidines.

The content of the ultraviolet absorber is preferably 0.001% to 3.0% by mass with respect to the total amount (100% by mass) of the resin composition.

<Fluidity Modifier>

Examples of the fluidity modifier used in one aspect of the present invention may include "METABLEN TP-001" and "METABLEN TP-003" (product names; manufactured by MITSUBISHI RAYON CO., LTD.).

The content of the fluidity modifier is preferably 0.01% to 10.0% by mass with respect to the total amount (100% by mass) of the resin composition.

<Crystal Nucleating Agent>

The crystal nucleating agent used in one aspect of the present invention may be either an inorganic crystal nucleating agent, or an organic crystal nucleating agent.

Examples of the inorganic crystal nucleating agent may include a natural or synthetic silicate compound, titanium oxide, barium sulfate, tricalcium phosphate, calcium carbonate, sodium phosphate, kaolinite, halloysite, talc, smectite, vermulite, and mica.

Examples of the organic crystal nucleating agent may include: amide; organic acid metal salts such as sodium benzoate, aluminum dibenzoate, potassium benzoate, lithium benzoate, sodium β-naphthalate, sodium cyclohexane carboxylate, and zinc phenylphosphonate; and sorbitol derivatives such as 1,3:2,4-bis-O-(4-methylbenzylidene)-D-sorbitol, and nonitol derivatives.

The content of the crystal nucleating agent is preferably 0.01% to 3.0% by mass with respect to the total amount (100% by mass) of the resin composition.

<Strengthening Agent>

Examples of the strengthening agent used in one aspect of the present invention may include inorganic fibers or organic fibers, such as glass fibers, ceramic fibers, carbon fibers, and metal coated glass fibers. In addition, the surfaces of these fibers may be treated with a silane compound and the like.

The content of the strengthening agent is preferably 0.01% to 3.0% by mass with respect to the total amount (100% by mass) of the resin composition.

<Dye>

Examples of the dye used in one aspect of the present invention may include a nitroso dye, a nitro dye, an azo dye, a stilbeneazo dye, a ketoimine dye, a triphenylmethane dye, a xanthene dye, an acridine dye, a quinoline dye, a methine/polymethine dye, a thiazole dye, an indamine/indophenol dye, an azine dye, an oxazine dye, a thiazine dye, a sulfur dye, an aminoketone/oxyketone dye, an anthraquinone dye, an indigoid dye, and a phthalocyanine dye.

The content of the dye is preferably 0.001% to 3.0% by mass with respect to the total amount (100% by mass) of the resin composition.

<Antistatic Agent>

Examples of the antistatic agent used in one aspect of the present invention may include: inorganic antistatic agents such as zinc oxide, titanium oxide, and carbon black; and organic antistatic agents such as a conductive polymer and an organic surfactant.

The content of the antistatic agent is preferably 0.001% to 3.0% by mass with respect to the total amount (100% by mass) of the resin composition.

<Bluing Agent>

As bluing agents used in one aspect of the present invention, those used together with common polycarbonate resins can be used. The bluing agent may be, for example, an anthraquinone dye.

The content of the bluing agent is preferably 0.0001% to 0.001% by mass with respect to the total amount (100% by mass) of the resin composition.

<Antibacterial Agent>

Examples of the antibacterial agent used in one aspect of the present invention may include: organic antibacterial agents, such as a chlorinated antibacterial agent, a phenolic antibacterial agent, an imidazole-based antibacterial agent, a thiazole-based antibacterial agent, and a quaternary ammonium-based antibacterial agent; and inorganic antibacterial agents, such as a zeolite-based antibacterial agent comprising a metal such as silver or zinc, an apatite-based antibacterial agent, a silicaalumina-based antibacterial agent, a ceramic antibacterial agent, a zirconium phosphate-based antibacterial agent, a silica gel-based antibacterial agent, a hydroxyapatite-based antibacterial agent, and a calcium silicate-based antibacterial agent.

The content of the antibacterial agent is preferably 0.01% to 3.0% by mass with respect to the total amount (100% by mass) of the resin composition.

In the present resin composition, phenolic components generated upon the production of the resin composition and monomer components that have not reacted and have remained, may be present as impurities, together with the aforementioned thermoplastic resin.

The content of the phenolic components in the resin composition is preferably 0.1 to 3000 ppm by mass, more preferably 0.1 to 2000 ppm by mass, more preferably 1 to 1000 ppm by mass, further preferably 1 to 800 ppm by mass, still further preferably 1 to 500 ppm by mass, and even further preferably 1 to 300 ppm by mass, with respect to the total amount (100% by mass) of the resin composition.

On the other hand, the content of the raw material monomers in the resin composition is preferably 0.1 to 3000 ppm by mass, more preferably 0.1 to 1000 ppm by mass, and further preferably 1 to 500 ppm by mass, with respect to the total amount (100% by mass) of the resin composition.

The molded body of one aspect of the present invention can be obtained by injection molding a resin composition comprising a thermoplastic resin into a desired shape, using an injection molding machine or an injection compression molding machine. Molding conditions for the injection molding are determined, as appropriate, depending on the intended use or shape of the molded body. The molding temperature is preferably set at 180° C. to 280° C., and the injection pressure is preferably set at 50 to 1700 kg/cm².

Since the molded body of one aspect of the present invention has excellent optical properties, it is preferably used as an optical member.

Examples of the optical member may include a film, a prism, and an optical lens. In particular, an optical lens is preferable.

In order to avoid, as much as possible, the mixing of foreign matters into the optical lens, the molding environment must be naturally a low-dust environment, and the class is preferably 1000 or less, and more preferably 100 or less.

The optical lens of one aspect of the present invention is preferably used in the shape of an aspherical lens, as necessary. Since the aspherical lens can reduce spherical aberration to substantially zero with a single lens thereof, it is not necessary to eliminate the spherical aberration by a combination of a plurality of spherical lenses, and thereby, it becomes possible to achieve weight saving and a reduction in production costs. Therefore, among the optical lenses, the aspherical lens is particularly useful as a camera lens. The astigmatism of the aspherical lens is preferably 0 to 15 mλ, and more preferably 0 to 10 mk.

The thickness of the optical lens of one aspect of the present invention can be set to be in a wide range depending on intended use, and is not particularly limited. The thickness of the present optical lens is preferably 0.01 to 30 mm, and more preferably 0.1 to 15 mm.

An antireflection layer may be established on the surface of the optical lens of one aspect of the present invention, as necessary.

The antireflection layer may be either a single layer or a multilayer.

In addition, the antireflection layer may be formed from an organic matter, or may also be formed from an inorganic matter. The antireflection layer is preferably formed from an inorganic matter.

Examples of the inorganic matter that forms the antireflection layer may include oxides or fluorides, such as silicon oxide, aluminum oxide, zirconium oxide, titanium oxide, cerium oxide, magnesium oxide, or magnesium fluoride.

Among these, silicon oxide and zirconium oxide are preferable, and a combined use of silicon oxide and zirconium oxide is more preferable.

Moreover, the antireflection layer is not particularly limited in terms of a combination of a single layer/a multilayer, components constituting the layers, a combination of the thicknesses of the layers, etc. Two-layer configuration or three-layer configuration is preferable, and three-layer configuration is particularly preferable. Furthermore, it is preferable that the antireflection layer as a whole may be formed to result in a thickness that is 0.00017% to 3.3%, based on the thickness of the optical lens, and specifically, a thickness of 0.05 to 3 μm, and particularly preferably 1 to 2 μm.

EXAMPLES

Hereinafter, the present invention will be more specifically described in the following examples. However, these examples are not intended to limit the scope of the present invention. It is to be noted that the measurement values described in the examples were obtained by applying the following methods or apparatuses.

(1) Weight Average Molecular Weight (Mw)

Gel permeation chromatography (GPC) was adopted, tetrahydrofuran was used as a developing solvent, and a calibration curve was produced using standard polystyrene whose molecular weight had been known (molecular weight distribution=1). Based on this calibration curve, the weight average molecular weight (Mw) was calculated from the retention time of GPC.

(2) Refractive Index Nd

The resin was press-molded into a disk having a diameter of 40 mm and a thickness of 3 mm (molding conditions: 200° C., 100 kgf/cm², and 2 minutes), and was then cut at a right angle to obtain a test piece. The obtained test piece was then measured using a precision refractometer (manufactured by Shimadzu Corporation; product name: "KPR-200").

(3) Glass Transition Temperature (Tg)

The glass transition temperature (Tg) was measured in accordance with JIS K7121-1987, using a differential scanning calorimeter (DSC).

(4) Specific Gravity

An electronic hydrometer (manufactured by ALFAMiRAGE; product name: "electronic hydrometer SD-200L") was used to the test piece used in the measurement of the refractive index nd in (4) above in accordance with JIS K7112, so that the specific gravity of a film (molded body) was measured.

(5) Birefringence

The resins were each molded into a film having a thickness of 100 μm, which was then subjected to uniaxial extension to an extension magnification of 1.5 times at the Tg of the resin+20° C. Thereafter, the phase difference at 600 nm was measured using an ellipsometer (manufactured by JASCO Corporation; product name "M-220"), and the value of birefringence was then obtained.

(6) Photoelastic Coefficient

The resins were each molded into a film having a thickness of 100 μm, and the photoelastic coefficient was then measured using an ellipsometer (manufactured by JASCO Corporation; product name "M-220").

(7) Pencil Hardness

The resins were each molded into a film having a thickness of 100 μm, and the pencil hardness was then measured in accordance with JIS K5600-5-4, using pencils having various hardness (manufactured by Mitsubishi Pencil Co., Ltd., product name:

The following abbreviations of compounds are used in the following description.

D-NDM-Me: Decahydro-1,4:5,8-dimethanonaphthalene-3-methyl-dimethanol (the compound represented by the above general formula (1), wherein $R^1$ represents a methyl group, and $R^2$ and $R^3$ each represent a hydrogen atom)

D-NDM: Decahydro-1,4:5,8-dimethanonaphthalenedimethanol (the compound represented by the above general formula (1), wherein R', $R^2$ and $R^3$ each represent a hydrogen atom)

BPA: 2,2'-Bis(4-hydroxyphenyl)propane

EG: Ethylene glycol

FDPM: Dimethyl fluorene-9,9-dipropionate

DMT: Dimethyl terephthalate

Production Example 1 (Synthesis of D-NDM-Me)

The synthetic scheme of D-NDM-Me is as follows.

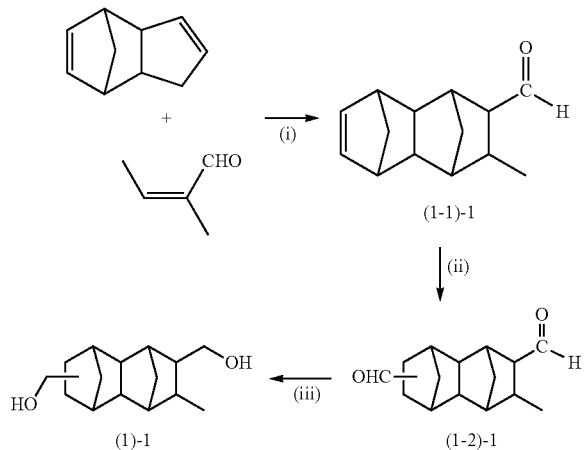

In addition, the following conditions were applied to the gas chromatography measurement and GC-MS measurement of the product obtained in each step of Production Example 1.
(1) Conditions for the Gas Chromatography Measurement
  Analysis apparatus: Capillary Gas Chromatograph GC-2010 Plus, manufactured by Shimadzu Corporation
  Analysis column: InertCap1 (30 m, 0.32 mm I.D., film thickness: 0.25 μm), manufactured by GL Sciences Inc.
  Oven temperature: 60° C. (0.5 minutes)—temperature increasing rate: 15° C./min-280° C. (4 minutes)
  Detector: FID, temperature: 280° C.
(2) Conditions for the GC-MS Measurement
  Analysis apparatus: GCMS-QP2010 Plus, manufactured by Shimadzu Corporation
  Ionization voltage: 70 eV
  Analysis column: DB-1 (30 m, 0.32 mm I.D., film thickness: 1.00 μm), manufactured by Agilent Technologies
  Oven temperature: 60° C. (0.5 minutes)—temperature increasing rate: 15° C./min-280° C. (4 minutes)
  Detector temperature: 280° C.
<Step (i)>
Into a 500 mL reactor made of stainless steel, crotonaldehyde (149.8 g; 2.14 mol) and dicyclopentadiene (202.9 g; 1.53 mol) were added, and a reaction was then carried out at 210° C. for 3 hours.

After completion of the reaction, a reaction solution containing 116.0 g of the compound represented by the above formula (1-1)-1 and 22.0 g of tricyclopentadiene was obtained. This reaction solution was subjected to simple distillation purification, and almost the entire amount of the obtained reaction solution was subjected to the reaction in the subsequent step.
<Step (ii)>
Into a 500 mL reactor made of stainless steel, the mixed solution of the compound represented by the above formula (1-1)-1 (106.8 g; 0.53 mol) and tricyclopentadiene (19.8 g; 0.10 mol), which was obtained in the above step (i), was added, and thereafter, 2-octanol (120 g; 0.92 mol), triphenyl phosphite (0.58 g; 1.88 mmol), and Rh(acac)(CO)$_2$ (0.005 g; 0.019 mmol) were further added.

Substitution of the inside of the reactor with nitrogen and CO/H$_2$ mixed gas (CO/H$_2$=1/1 (molar ratio)) was carried out three times. Subsequently, the inside of the reactor was pressurized with CO/H$_2$ mixed gas (CO/H$_2$=1/1 (molar ratio)) to a pressure of 2 MPa, and a reaction was then carried out at 100° C. for 3 hours.

After completion of the reaction, the reaction solution was analyzed by gas chromatography. As a result, it was confirmed that the reaction solution was a reaction solution comprising the bifunctional compound (118.3 g; 0.51 mol) represented by the above formula (1-2)-1 and pentacyclopentadecene monoaldehyde (22.0 g; 0.10 mol) (conversion rate: 99.5%; selectivity: 97%). Besides, almost the entire amount of this reaction solution was subjected to the reaction in the subsequent step.
<Step (iii)>
Into a 500 mL reactor made of stainless steel, the reaction solution comprising the bifunctional compound (116.0 g; 0.50 mol) represented by the above formula (1-2)-1 and pentacyclopentadecene monoaldehyde (21.5 g; 0.09 mol), which was obtained in the above step (ii), was added, and thereafter, 2-octanol (118 g; 0.90 mol) and 7 g of a Cu—Zn—Al catalyst (manufactured by JGC Catalysts and Chemicals Ltd.; product name "E-01X") were further added.

Thereafter, the inside of the reaction system was pressurized with hydrogen gas to 2 MPa, and a reaction was then carried out 140° C. for 5 hours.

After completion of the reaction, the obtained slurry was diluted with methanol, and the catalyst was filtrated through a membrane filter with a pore diameter of 0.2 μm. After that, the solvent was distilled away using an evaporator to obtain a concentrate.

This concentrate was analyzed by gas chromatography and GC-MS. As a result, it was confirmed that the concentrate contained D-NDM-Me (115.0 g; 0.49 mol) having a molecular weight of 236, which was represented by the above formula (1)-1 (main product yield: 98%). The concentrate was further subjected to distillation and purification to obtain D-NDM-Me (101.2 g; 0.43 mol; purity: 99.6 GC %; distillation yield: 88%).

Besides, it was found that, in the obtained D-NDM-Me represented by the above formula (1)-1, "2,6-isomer" (the compound represented by the above general formula (1a)/ "2,7-isomer" (the compound represented by the above general formula (1b))=35/65 to 65/35 (mass ratio).

Example 1

D-NDM-Me synthesized in Production Example 1 (250.00 g; 1.058 mol), diphenyl carbonate (229.00 g; 1.069 mol), and titanium tetrabutoxide (20.0 mg; 6.0×10$^{-5}$ mol) were each added into a 500 mL reactor equipped with a stirrer and a distillation apparatus, and nitrogen gas was then introduced into the reaction system. The obtained mixture was heated to 180° C. over 1 hour in a nitrogen atmosphere under a pressure of 101.3 kPa, while stirring. After the temperature reached 180° C., the pressure was reduced to 40 kPa over 30 minutes, and the temperature was increased to 255° C. over 2 hours after initiation of the pressure reduction. When distilled methanol and distilled phenol became 60%, the pressure was further reduced to 0.133 kPa or less over 1 hour. Thereafter, the reaction mixture was retained under 0.133 kPa or less for 30 minutes, so as to obtain a polycarbonate resin (1).

The polycarbonate resin (1) is a polymer with Mw=28,000, which has the constituent represented by the general formula (I-A) (wherein $R^1$ is a methyl group, and $R^2$ and $R^3$ are hydrogen atoms).

The physical properties of the polycarbonate resin (1) were as follows: refractive index nd: 1.525, Tg: 127° C., specific gravity: 1.16, birefringence: 77 nm, photoelastic coefficient: $7\times10^{-12}$ $Pa^{-1}$, and pencil hardness: F.

Example 2

D-NDM-Me synthesized in Production Example 1 (210.00 g; 0.888 mol), FDPM (66.00 g; 0.195 mol), diphenyl carbonate (153.00 g; 0.714 mol), and titanium tetrabutoxide (30.0 mg; $8.8\times10^{-5}$ mol) were each added into a 500 mL reactor equipped with a stirrer and a distillation apparatus, and the same operations as those in Example 1 were then carried out to obtain a polyester carbonate resin (2).

The polyester carbonate resin (2) is a polymer with Mw=32,000, which has the constituent unit represented by the general formula (I-A) and the constituent unit represented by the general formula (I-B) (wherein, in each formula, $R^1$ is a methyl group, and $R^2$ and $R^3$ are hydrogen atoms, and in the formula (I-B), Q is the group represented by the above formula (i) (wherein $X^1$ and $X^2$ are methylene groups)).

The physical properties of the polyester carbonate resin (2) were as follows: refractive index nd: 1.545, Tg: 127° C., specific gravity: 1.18, birefringence: 14 nm, photoelastic coefficient: $10\times10^{12}$ $Pa^{-1}$, and pencil hardness: F.

Example 3

D-NDM-Me synthesized in Production Example 1 (193.50 g; 0.819 mol), EG (8.50 g; 0.137 mol), DMT (79.50 g; 0.409 mol), diphenyl carbonate (118.80 g; 0.555 mol), and titanium tetrabutoxide (19.0 mg; $5.6\times10^{-5}$ mol) were each added into a 500 mL reactor equipped with a stirrer and a distillation apparatus, and the same operations as those in Example 1 were then carried out to obtain a polyester carbonate resin (3).

The polyester carbonate resin (3) is a polymer with Mw=29,000, which has the constituent unit represented by the general formula (I-A) and the constituent unit represented by the general formula (I-B) (wherein, in each formula, $R^1$ is a methyl group, and $R^2$ and W are hydrogen atoms, and in the formula (I-B), Q is a phenylene group).

The physical properties of the polyester carbonate resin (3) were as follows: refractive index nd: 1.537, Tg: 134° C., specific gravity: 1.20, birefringence: 95 nm, photoelastic coefficient: $35\times10^{-12}$ $Pa^{-1}$, and pencil hardness: F.

Example 4

D-NDM-Me synthesized in Production Example 1 (171.06 g; 0.724 mol), EG (78.61 g; 1.267 mol), DMT (175.68 g; 0.905 mol), and titanium tetrabutoxide (18.0 mg; $5.3\times10^{-5}$ mol) were each added into a 500 mL reactor equipped with a stirrer and a distillation apparatus, and thereafter, the temperature was increased to 230° C. in a nitrogen atmosphere and was then retained for 1 hour, so that a predetermined amount of methanol was distilled away.

Subsequently, temperature rise and pressure reduction were gradually carried out, and while an excessive amount of EG was distilled away, polycondensation was finally carried out at 270° C. under 0.1 kPa or less. When the reaction mixture had a moderate melt viscosity, the reaction was terminated, so as to obtain a polyester resin (4).

The polyester resin (4) is a copolymer with Mw=28,000, which has the constituent unit represented by the general formula (I-B) (wherein R' is a methyl group, $R^2$ and $R^3$ are hydrogen atoms, and Q is a phenylene group).

The physical properties of the polyester resin (4) were as follows: refractive index nd: 1.548, Tg: 130° C., specific gravity: 1.22, birefringence: 134 nm, photoelastic coefficient: $55\times10^{-12}$ $Pa^{-1}$, and pencil hardness: F.

Comparative Example 1

D-NDM synthesized by the method described in Patent Literature 3 (250.00 g; 1.124 mol), diphenyl carbonate (243.50 g; 1.137 mol), and sodium hydrogen carbonate (0.8 mg; $9.9\times10^{-6}$ mol) were each added into a 500 mL reactor equipped with a stirrer and a distillation apparatus, and the same operations as those in Example 1 were then carried out to obtain a polycarbonate resin (i) with Mw=32,000.

The physical properties of this polycarbonate resin (i) were as follows: refractive index nd: 1.531, Tg: 133° C., specific gravity: 1.20, birefringence: 100 nm, photoelastic coefficient: $8\times10^{-12}$ $Pa^{-1}$, and pencil hardness: 2B.

Comparative Example 2

BPA (255.00 g; 1.117 mol), diphenyl carbonate (245.00 g; 1.144 mol), and sodium hydrogen carbonate (0.8 mg; $9.9\times10^{-6}$ mol) were each added into a 500 mL reactor equipped with a stirrer and a distillation apparatus, and the same operations as those in Example 1 were then carried out to obtain a polycarbonate resin (ii) with Mw=33,000.

The physical properties of this polyester carbonate resin (ii) were as follows: refractive index nd: 1.582, Tg: 143° C., specific gravity: 1.20, birefringence: 548 nm, photoelastic coefficient: $80\times10^{-12}$ $Pa^d$, and pencil hardness: 2B.

Comparative Example 3

D-NDM synthesized by the method described in Patent Literature 3 (200.00 g; 0.900 mol), FDPM (66.67 g; 0.197 mol), diphenyl carbonate (155.00 g; 0.724 mol), and titanium tetrabutoxide (29.1 mg; $8.6\times10^{-5}$ mol) were each added into a 500 mL reactor equipped with a stirrer and a distillation apparatus, and the same operations as those in Example 1 were then carried out to obtain a polyester carbonate resin (iii) with Mw=32,000.

The physical properties of this polyester carbonate resin (iii) were as follows: refractive index nd: 1.550, Tg: 132° C., specific gravity: 1.21, birefringence: 20 nm, photoelastic coefficient: $11\times10^{-12}$ $Pa^{-1}$, and pencil hardness: B.

Comparative Example 4

D-NDM synthesized by the method described in Patent Literature 3 (182.20 g; 0.820 mol), EG (8.50 g; 0.137 mol), DMT (79.50 g; 0.409 mol), diphenyl carbonate (119.00 g; 0.556 mol), and titanium tetrabutoxide (18.0 mg; $5.3\times10^{-5}$ mol) were each added into a 500 mL reactor equipped with a stirrer and a distillation apparatus, and the same operations as those in Example 1 were then carried out to obtain a polyester carbonate resin (iv) with Mw=28,000.

The physical properties of this polyester carbonate resin (iv) were as follows: refractive index nd: 1.540, Tg: 137° C., specific gravity: 1.22, birefringence: 130 nm, photoelastic coefficient: 48×10$^{-12}$ Pa$^{d}$, and pencil hardness: B.

Comparative Example 5

D-NDM synthesized by the method described in Patent Literature 3 (166.55 g; 0.749 mol), EG (81.37 g; 1.311 mol), DMT (181.83 g; 0.936 mol), and titanium tetrabutoxide (18.0 mg; 5.3×10$^{-5}$ mol) were each added into a 500 mL reactor equipped with a stirrer and a distillation apparatus, and thereafter, the temperature was increased to 230° C. in a nitrogen atmosphere and was then retained for 1 hour, so that a predetermined amount of methanol was distilled away.

Subsequently, temperature rise and pressure reduction were gradually carried out, and while an excessive amount of EG was distilled away, polycondensation was finally carried out at 270° C. under 0.1 kPa or less. When the reaction mixture had a moderate melt viscosity, the reaction was terminated, so as to obtain a polyester resin (v) with Mw=29,000.

The physical properties of this polyester resin (v) were as follows: refractive index nd: 1.551, Tg: 135° C., specific gravity: 1.24, birefringence: 162 nm, photoelastic coefficient: 65×10$^{-12}$ Pa$^{-1}$, and pencil hardness: B.

The physical property values of individual resins obtained in the above Examples and Comparative Examples are as shown in Table 1.

It is to be noted that the content ratio among the constituent units derived from individual monomers in each resin shown in Table 1 was calculated by measuring the abundance ratio of $^1$H pertaining to each monomer based on the following $^1$H-NMR measurement conditions.

($^1$H-NMR measurement conditions)

Apparatus: JNM-ECA500 (500 MHz), manufactured by JEOL Ltd.

Measurement mode: $^1$H-NMR

Solvent: CDCl$_3$ (deuterated chloroform)

Internal standard substance: Tetramethylsilane

TABLE 1

| | | | Ex. 1 Polycarbonate resin (1) | Ex. 2 Polyester carbonate resin (2) | Ex. 3 Polyester carbonate resin (3) | Ex. 4 Polyester resin (4) | Comp. Ex. 1 Polycarbonate resin (i) |
|---|---|---|---|---|---|---|---|
| Diol component | D-NDM-Me | mol % | 50 | 49 | 43 | 40 | — |
| | D-NDM | | — | — | — | — | 50 |
| | BPA | | — | — | — | — | — |
| | EG | | — | — | 7 | 10 | — |
| Carboxylic acid component | FDPM | mol % | — | 11 | — | — | — |
| | DMT | | — | — | 21 | 50 | — |
| Diphenyl carbonate | | mol % | 50 | 40 | 29 | — | 50 |
| Physical properties | Mw | — | 28,000 | 32,000 | 29,000 | 28,000 | 32,000 |
| | Refractive index nd | — | 1.525 | 1.545 | 1.537 | 1.548 | 1.531 |
| | Tg | ° C. | 127 | 127 | 134 | 130 | 133 |
| | Specific gravity | — | 1.16 | 1.18 | 1.20 | 1.22 | 1.20 |
| | Birefringence | nm | 77 | 14 | 95 | 134 | 100 |
| | Photoelastic coefficient | ×10$^{-12}$ Pa$^{-1}$ | 7 | 10 | 35 | 55 | 8 |
| | Pencil hardness | — | F | F | F | F | 2B |

| | | | Comp. Ex. 2 Polyester carbonate resin (ii) | Comp. Ex. 3 Polyester carbonate resin (iii) | Comp. Ex. 4 Polyester carbonate resin (iv) | Comp. Ex. 5 Polyester resin (v) |
|---|---|---|---|---|---|---|
| Diol component | D-NDM-Me | mol % | — | — | — | — |
| | D-NDM | | — | 49 | 43 | 40 |
| | BPA | | 49 | — | — | — |
| | EG | | — | — | 7 | 10 |
| Carboxylic acid component | FDPM | mol % | — | 11 | — | — |
| | DMT | | — | — | 21 | 50 |
| Diphenyl carbonate | | mol % | 51 | 40 | 29 | — |
| Physical properties | Mw | — | 33,000 | 32,000 | 28,000 | 29,000 |
| | Refractive index nd | — | 1.582 | 1.550 | 1.540 | 1.551 |
| | Tg | ° C. | 143 | 132 | 137 | 135 |
| | Specific gravity | — | 1.20 | 1.21 | 1.22 | 1.24 |
| | Birefringence | nm | 548 | 20 | 130 | 162 |
| | Photoelastic coefficient | ×10$^{-12}$ Pa$^{-1}$ | 80 | 11 | 48 | 65 |
| | Pencil hardness | — | 2B | B | B | B |

As shown in Table 1, the film formed using the thermoplastic resin obtained in each of Examples 1 to 4 was a molded body having low specific gravity, low birefringence, reduced photoelastic coefficient and high hardness, and thus, it is said that the film had excellent optical properties.

On the other hand, in the case of the film formed using the thermoplastic resin obtained in each of Comparative Examples 1 to 5, at least one of the properties of the film, namely, at least one of birefringence, specific gravity, photoelastic coefficient and pencil hardness was not sufficiently satisfactory.

The invention claimed is:

1. A thermoplastic resin having a constituent unit represented by the following general formula (I):

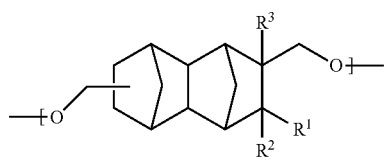
(I)

wherein $R^1$ represents a hydrocarbon group containing 1 to 6 carbon atoms, and $R^2$ and $R^3$ each independently represent a hydrogen atom or a methyl group.

2. The thermoplastic resin according to claim 1, wherein the constituent unit comprises a constituent unit (a) derived from a compound represented by the following general formula (1a) and a constituent unit (b) derived from a compound represented by the following general formula (1b):

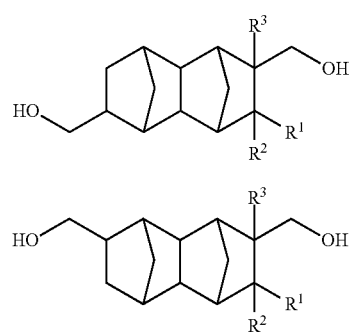
(1a)

(1b)

wherein, in the above formulae (1a) and (1b), $R^1$, $R^2$ and $R^3$ are the same as those in the general formula (I).

3. The thermoplastic resin according to claim 2, wherein a content ratio [(a)/(b)] between the constituent unit (a) and the constituent unit (b) is 1/99 to 99/1 at a molar ratio.

4. The thermoplastic resin according to claim 1, which is a polycarbonate resin, a polyester resin, or a polyester carbonate resin.

5. The thermoplastic resin according to claim 1, which has a constituent unit represented by the following general formula (I-A):

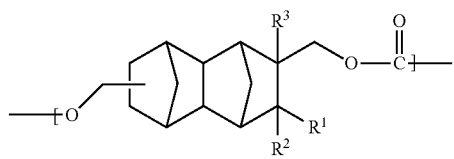
(I-A)

wherein $R^1$, $R^2$ and $R^3$ are the same as those in the general formula (I).

6. The thermoplastic resin according to claim 1, which has a constituent unit represented by the following general formula (I-B):

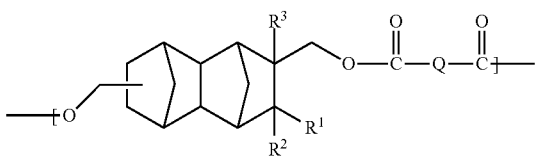
(I-B)

wherein $R^1$, $R^2$ and $R^3$ are the same as those in the general formula (I), and Q represents a hydrocarbon group containing 2 to 30 carbon atoms.

7. The thermoplastic resin according to claim 1, which has a constituent unit represented by the following general formula (I-A) and a constituent unit represented by the following general formula (I-B):

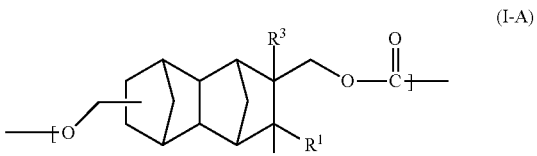
(I-A)

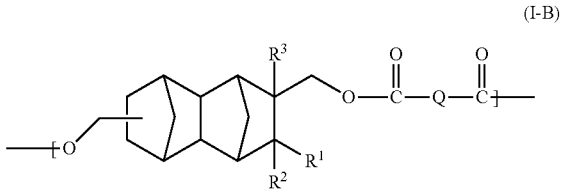
(I-B)

wherein, in the above formulae (I-A) and (I-B), $R^1$, $R^2$ and $R^3$ are the same as those in the general formula (I), and Q represents a hydrocarbon group containing 2 to 30 carbon atoms.

8. The thermoplastic resin according to claim 5, which further has a constituent unit represented by the following general formula (II):

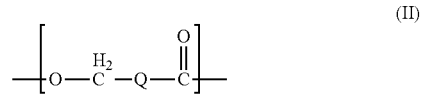
(II)

wherein Q represents a hydrocarbon group containing 2 to 30 carbon atoms.

9. The thermoplastic resin according to claim 6, wherein Q is a group represented by the following general formula (i) or (ii):

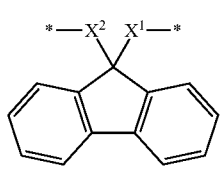
(i)

-continued

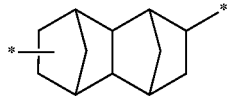
(ii)

wherein, in the above formulae (i) and (ii), $X^1$ and $X^2$ each independently represent a hydrocarbon group containing 1 to 12 carbon atoms, and * represents a binding site.

10. The thermoplastic resin according to claim 1, wherein the weight average molecular weight (Mw) of the thermoplastic resin is 5,000 to 50,000.

11. The thermoplastic resin according to claim 1, wherein $R^1$ represents a methyl group, an ethyl group, or a phenyl group, and $R^2$ and $R^3$ each represent a hydrogen atom.

12. The thermoplastic resin according to claim 1, wherein $R^1$ represents a methyl group, and $R^2$ and $R^3$ each represent a hydrogen atom.

13. A molded body formed by molding a resin composition comprising the thermoplastic resin according to claim 1.

14. The molded body according to claim 13, which is an optical member.

15. The molded body according to claim 13, which is an optical lens.

16. A monomer for thermoplastic resin, which is represented by the following general formula (1):

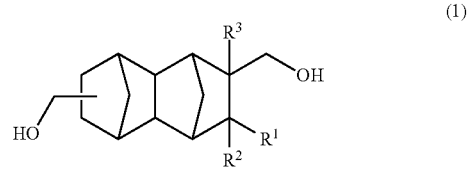
(1)

wherein $R^1$ represents a hydrocarbon group containing 1 to 6 carbon atoms, and $R^2$ and $R^3$ each independently represent a hydrogen atom or a methyl group.

17. The monomer for thermoplastic resin according to claim 16, which is a monomer for a thermoplastic resin used as a molding material for an optical member.

* * * * *

UNITED STATES PATENT AND TRADEMARK OFFICE
CERTIFICATE OF CORRECTION

| | | |
|---|---|---|
| PATENT NO. | : 12,037,451 B2 | Page 1 of 1 |
| APPLICATION NO. | : 17/602394 | |
| DATED | : July 16, 2024 | |
| INVENTOR(S) | : Honda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this
Twelfth Day of August, 2025

Coke Morgan Stewart
*Acting Director of the United States Patent and Trademark Office*